United States Patent
Gumpoltsberger

(10) Patent No.: US 7,507,179 B2
(45) Date of Patent: Mar. 24, 2009

(54) MULTI-SPEED TRANSMISSION

(75) Inventor: Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 293 days.

(21) Appl. No.: 11/705,074

(22) Filed: Feb. 9, 2007

(65) Prior Publication Data

US 2007/0202983 A1   Aug. 30, 2007

(30) Foreign Application Priority Data

Feb. 14, 2006   (DE)   ........................ 10 2006 006 616

(51) Int. Cl.
*F16H 3/44*   (2006.01)
(52) U.S. Cl. ........................ 475/285; 475/5; 475/284; 475/292; 475/330; 180/65.7
(58) Field of Classification Search ................. 475/271, 475/284, 285, 292, 330, 5; 180/65.2, 65.7
See application file for complete search history.

(56) References Cited

U.S. PATENT DOCUMENTS

| 4,395,925 | A | 8/1983 | Gaus |
| 5,106,352 | A | 4/1992 | Lepelletier |
| 6,139,463 | A | 10/2000 | Kasuya et al. |
| 6,558,287 | B2 | 5/2003 | Hayabuchi et al. |
| 6,572,507 | B1 | 6/2003 | Korkmaz et al. |
| 6,634,980 | B1 | 10/2003 | Ziemer |
| 6,860,831 | B2 | 3/2005 | Ziemer |
| 7,018,319 | B2 | 3/2006 | Ziemer |
| 7,303,500 | B2 * | 12/2007 | Baldwin ..................... 475/276 |
| 7,396,305 | B2 * | 7/2008 | Raghavan et al. ............. 475/5 |

FOREIGN PATENT DOCUMENTS

| DE | 29 36 969 | 4/1981 |
| DE | 199 12 480 | 9/2000 |
| DE | 199 49 507 | 4/2001 |
| DE | 101 15 983 | 10/2002 |
| DE | 101 15 987 | 10/2002 |
| DE | 102 13 820 | 10/2002 |
| EP | 0 434 525 | 6/1991 |

* cited by examiner

*Primary Examiner*—David D. Le
(74) *Attorney, Agent, or Firm*—Davis & Bujold, P.L.L.C.

(57) ABSTRACT

A multi-speed transmission with six forward gears and one reverse gear having an input and output shaft, three planetary gear sets (P1, P2, P3), six rotatable shafts and five control elements. The input shaft communicates with the gear set (P2), the shaft (3), and the shaft (4). The shaft (3) communicates with the carrier of the gear set (P1), the housing and the shaft (6). The shaft (4) communicates with the gear set (P1) and the housing. The shaft (5) communicates with the gear set (P1) and the gear set (P3). The shaft (6) communicates with the gear set (P2). The output shaft communicates with the gear set (P3) and the gear set (P2), and the gear set (P3) communicates with the housing.

24 Claims, 3 Drawing Sheets

| | 1. | 2. | 3. | 4. | 5. | 6. | R1. |
|---|---|---|---|---|---|---|---|
| i_G: | 3,282 | 2,037 | 1,326 | 1,000 | 0,713 | 0,545 | -2,316 |
| phi: | 6,023 | 1,610 | 1,537 | 1,326 | 1,403 | 1,308 | -0,706 |
| 03 | x | | | | | | x |
| 04 | | x | | | | x | |
| 13 | | | | x | x | x | |
| 14 | | | x | | x | | x |
| 36 | x | x | x | x | | | |

MULTI-SPEED TRANSMISSION

This application claims priority from German Application Serial No. 10 2006 006 616.2 filed Feb. 14, 2006.

FIELD OF THE INVENTION

The present invention relates to a multi-speed transmission in planetary design, particularly an automatic transmission for a motor vehicle.

BACKGROUND OF THE INVENTION

According to the state of the art, automatic transmissions, particularly for motor vehicles, comprise planetary gear sets, which are shifted using friction and/or control elements, such as clutches and brakes, and which are typically connected to a starting element that is subject to a slip effect and optionally provided with a converter lock-up clutch, for example a hydrodynamic torque converter or a fluid clutch.

A transmission of this type is described in EP 0 434 525 A1. It comprises substantially one input shaft and one output shaft, which are disposed parallel to each other, a double planetary gear set concentric with the output shaft, and five control elements in the form of three clutches and two brakes, the selective operation of which, in pairs, determines the different gear ratios between the input shaft and the output shaft. This transmission has a front-mounted gear set and two power paths, so that by the selective engagement, in pairs, of the five control elements, six forward gears are obtained.

In the first power path, two clutches are required for transmitting the torque from the front-mounted gear set to two elements of the double planetary gear set. These elements are provided in the power flow direction substantially behind the front-mounted gear set in the direction of the double planetary gear set. In the second power path, a further clutch is provided, which detachably connects this path with a further element of the double planetary gear set. The clutches are disposed such that the inner disk carrier forms the output end.

Furthermore, from the published prior art document U.S. Pat. No. 6,139,463 a compact multi-speed transmission in planetary design, particularly for a motor vehicle, is known, which has two planetary gear sets and one front-mounted gear set, as well as three clutches and two brakes. In this known multi-speed transmission, two clutches C-1 and C-3 are provided in a first power path for transmitting the torque from the front-mounted gear set to the two planetary gear sets. The outer disk carrier and/or the cylinder or piston and pressure compensation sides of the clutch C-3 are connected with a first brake B-1. Furthermore, the inner disk carrier of the third clutch C-3 is connected to the cylinder and/or piston and pressure compensation sides of the first clutch C-1, the inner disk carrier of the first clutch C-1 being disposed on the output side and connected to a sun gear of the third planetary gear set.

From DE 199 49 507 A1 by the applicant, a multi-speed transmission is also known, according to which on the drive shaft two non-shiftable, front-mounted gear sets are provided, which on the output side generate two rotational speeds which, in addition to the rotational speed of the input shaft, can be switched by selectively engaging the control elements to a shiftable double planetary gear set that acts upon the output shaft, such that, for changing from one gear to the next higher or lower gear, only one of the two actuated control elements must be engaged or disengaged.

DE 199 12 480 A1 discloses an automatically shiftable motor vehicle transmission with three carrier-mounted planetary gear sets as well as three brakes and two clutches for switching between six forward gears and one reverse gear, and with one drive shaft and one output shaft. The automatically shiftable motor vehicle transmission is configured such that the drive shaft is directly connected to the sun gear of the second planetary gear set, and the drive shaft can be connected via the first clutch to the sun gear of the first planetary gear set and/or via the second clutch to the carrier of the first planetary gear set. Additionally or alternatively, the sun gear of the first planetary gear set can be connected via the first brake to the transmission housing and/or the carrier of the first planetary gear set can be connected via the second brake to the housing and/or the sun gear of the third planetary gear set can be connected via the third brake to the housing.

Furthermore, DE 102 13 820 A1 discloses a multi-speed automatic transmission comprising a first input path T1 of a first speed ratio, an input path T2, which has a larger speed ratio than the input path T1, a planetary gear set with four elements, wherein the four elements are arranged in order of the direction of power flow a first element, a second element, a third element and a fourth element, a clutch C-2 that transmits a rotation from the input path T2 to the first element S3, a clutch C-1 that transmits the rotation from the input path T2 to the fourth element S2, a clutch C4 that transmits a rotation from the input path T1 to the first element, a clutch C-3 that transmits the rotation from the input path T1 to the second element C3, a brake B-1 that engages the fourth element, a brake B-2 that engages the second element, and an output member that is coupled with the third element R3.

Within the scope of DE 101 15 983 A1 by the applicant, a multi-speed transmission is described, comprising a drive shaft that is linked with a front-mounted gear set, an output shaft that is connected with a rear-mounted gear set, and a maximum of seven control elements, through the selective shifting of which at least seven forward gears can be shifted without range shifting. The front-mounted gear set is formed by a front-mounted planetary gear set or a maximum of two non-shiftable front-mounted planetary gear sets that are linked with the first front-mounted planetary gear set, wherein the rear-mounted gear set is configured as a two-carrier four-shaft transmission with two shiftable rear-mounted planetary gear sets, and has four free shafts. The first free shaft of this two-carrier four-shaft transmission is connected with the first control element, the second free shaft with the second and third control elements, the third free shaft with the fourth and fifth control elements, and the fourth free shaft is connected with the output shaft. According to that invention, a multi-speed transmission with a total of six control elements is proposed, which connect the third free shaft or the first free shaft of the rear-mounted gear set additionally with a sixth shifting element. For a multi-speed transmission with a total of seven control elements, it is proposed according to that invention that the third free shaft is additionally connected with a sixth control element D', and the first free shaft is additionally connected with a seventh control element.

Furthermore, the scope of DE 101 15 987 by the applicant describes a multi-speed transmission with at least seven gears. In addition to the input shaft and the output shaft, this transmission comprises a non-shiftable front-mounted gear set and a shiftable rear-mounted gear set in the form of a two-carrier four-shaft transmission. The front-mounted gear set comprises a first planetary gear set, which, in addition to the input rotational speed of the input shaft, also provides a second rotational speed, which may optionally be shifted to a rear-mounted gear set. The rear-mounted gear set comprises two shiftable planetary gear sets, which can shift at least seven gears using the six shift elements, forming two power paths. During each shifting operation, range shifting is advantageously avoided. A 9-gear multi-speed transmission is further known from DE 29 36 969; it comprises eight control elements and four gear sets.

Automatic vehicle transmissions in planetary design in general have previously been described in the prior art on many occasions and undergo continuous developments and improvements. These transmissions should have, for example, a sufficient number of forward gears as well as one reverse gear and a gear ratio spread that is excellently suited for motor vehicles, having a high overall spread as well as favorable progressive ratios. Furthermore, they should allow a high starting gear ratio in the forward direction and should include a direct gear, and additionally should be suited for use both in passenger cars and in commercial vehicles. In addition, these transmissions should have a low complexity, in particular they should require a small number of control elements, and should avoid double-shifts when shifting sequentially, so that always only one control element is engaged when shifting in defined gear groups.

SUMMARY OF THE INVENTION

It is therefore the object of the present invention to propose a multi-speed transmission of the type mentioned above in which the design complexity is optimized and furthermore the efficiency in the main driving gears in terms of drag and gearing losses is improved. Furthermore, it is intended that low torque act on the control elements and planetary gear sets in the multi-speed transmission according to the invention, and that the rotational speeds of the shafts, control elements and planetary gear sets be kept as low as possible. In addition, the required number of gears and the spread of the gear ratios are also supposed to be maintained, advantageously implementing six forward gears and at least one reverse gear. Furthermore, the transmission according to the invention is supposed to be suitable for any design in a vehicle, particularly for a frontal-transverse configuration.

According to the invention, a multi-speed transmission in planetary design is proposed, which has one input shaft and one output shaft, which are disposed in a housing. Furthermore, at least three planetary gear sets—hereinafter referred to as the first, second and third planetary gear sets—, at least six rotatable shafts—hereinafter referred to as the input shaft, output shaft, third, fourth, fifth and sixth shafts—and at least five control elements, comprising brakes and clutches, are provided; the selective engagement of these components creates different gear ratios between the input shaft and the output shaft, so that preferably six forward gears and one reverse gear can be shifted.

The input shaft is permanently connected to the sun gear of the second planetary gear set, it can be detachably connected via a clutch to the third shaft and via a further clutch to the fourth shaft, wherein the third shaft is permanently connected to the carrier of the first planetary gear set, can be coupled to the housing via a brake, and can be detachably connected to the sixth shaft via a clutch, wherein the fourth shaft is permanently connected to the sun gear of the first planetary gear set and can be coupled to the housing via a brake.

Furthermore, the fifth shaft is permanently connected to the ring gear of the first planetary gear set and to the carrier of the third planetary gear set, wherein the sixth shaft is permanently connected to the ring gear of the second planetary gear set.

According to the invention, the output shaft is permanently connected to the ring gear of the third planetary gear set and to the carrier of the second planetary gear set, wherein the sun gear of the third planetary gear set is non-rotatably connected to the housing via a non-rotating shaft.

The configuration of the multi-speed transmission according to the invention produces suitable gear ratios, particularly for passenger cars, as well as a considerable increase in the total spread of ratios of the multi-speed transmission, resulting in improved driving comfort and a significant improvement in fuel economy.

In addition, the multi-speed transmission according to the invention allows a considerably decreased complexity to be achieved, due to the low number of control elements, preferably two brakes and three clutches. It is advantageously possible with the multi-speed transmission according to the invention to start driving with a hydrodynamic converter, a hydrodynamic clutch, an external starting clutch or other suitable external starting elements. It is also conceivable to allow a starting operation with a starting element that is integrated into the transmission. A control element, which is actuated in the first gear and in the reverse gear, is preferred.

In addition, good efficiency in the main driving gears with regard to drag and gearing losses can be achieved with the multi-speed transmission according to the invention.

Furthermore, low torque is present in the control elements and in the planetary gear sets of the multi-speed transmission, thus advantageously reducing the wear on the multi-speed transmission. In addition, the low torque makes correspondingly small dimensions possible, allowing reductions in the required installation space and the corresponding expenses. Also, the rotational speeds in the shafts, control elements and planetary gear sets are low.

In addition, the transmission according to the invention is designed such that it can be adjusted to different drive train configurations, both in the power flow direction and with regard to space.

BRIEF DESCRIPTION OF THE DRAWINGS

The invention will be explained in more detail hereinafter with reference to the exemplary embodiments in the figures, wherein.

DETAILED DESCRIPTION OF THE INVENTION

Figures 1, 2:
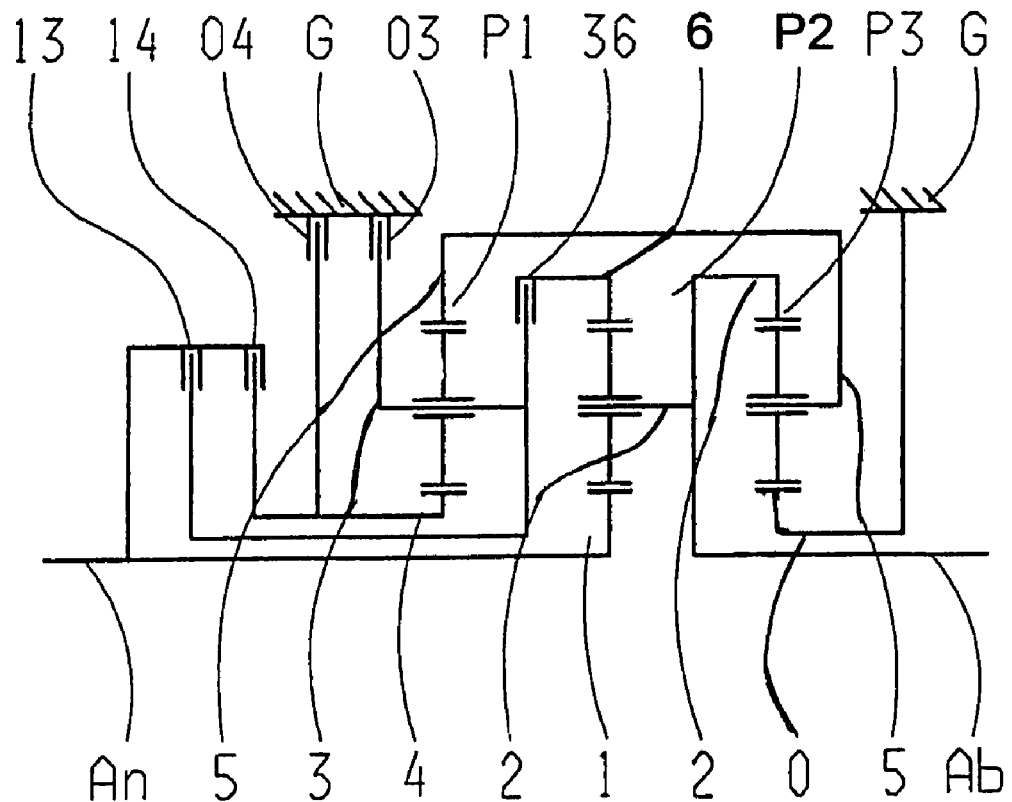
FIG. 1 is a schematic illustration of a preferred embodiment of a multi-speed transmission according to the invention.
FIG. 2 is an exemplary shifting pattern for the multi-speed transmission according to the invention from FIG. 1.

FIG. 1 shows a multi-speed transmission according to the invention comprising an input shaft 1 (An) and an output shaft 2 (Ab), which are disposed in a housing G. Three planetary gear sets P1, P2, P3 are provided, which are preferably configured as negative planetary gear sets and are disposed in the sequence P1, P2, P3 in the axial direction (and also in the power flow direction).

As can be seen from FIG. 1, only five control elements, namely two brakes 03, 04 and three clutches 13, 14, and 36, are provided. With these control elements, a selective engagement of preferably six forward gears and one reverse gear can be implemented. The multi-speed transmission according to the invention has a total of six rotatable shafts, namely the shafts 1, 2, 3, 4, 5 and 6.

According to the invention, it is provided on the multi-speed transmission according to FIG. 1 that the input occurs via the shaft 1, which is permanently connected to the sun gear of the second planetary gear set P2, can be detachably connected via a clutch 13 to the shaft 3 and via a clutch 14 to the shaft 4, wherein the shaft 3 is permanently connected to the carrier of the first planetary gear set P1, can be coupled to the housing G via the brake 03, and is detachably connected to the shaft 6 via the clutch 36, wherein the shaft 4 is permanently connected to the sun gear of the first planetary gear set P1 and can be coupled to the housing G via the brake 04.

Furthermore, the shaft 5 is permanently connected to the ring gear of the first planetary gear set P1 and to the carrier of the third planetary gear set P3, wherein the shaft 6 is permanently connected to the ring gear of the second planetary gear set P2.

The output occurs via the shaft 2, which is permanently connected to the ring gear of the third planetary gear set P3 and to the carrier of the second planetary gear set P2. Furthermore, the sun gear of the third planetary gear set P3 is non-rotatably connected to the housing G via the shaft 0.

Within the scope of the illustrated embodiments, the clutches 13 and 14 are disposed in front of the first planetary gear set P1 in the sequence 13, 14 from an axial point of view in the power flow direction, and may comprise a common outer disk carrier as disk clutches. The brakes 04, 03 are also disposed in front of the first planetary gear set P1 in the sequence 04, 03, from an axial point of view in the power flow direction.

The spatial configuration of the control elements is optional and is limited only by its dimension and outer shape.

FIG. 2 shows a shifting pattern of the multi-speed transmission of the invention according to FIG. 1 by way of example. For each gear, two control elements are engaged. The shifting pattern shows the respective gear ratios i of the individual gear steps and the resulting progressive ratios phi by way of example. Typical stationary gear ratio values for the planetary gear sets P1, P2, P3 are −3.250, −2.282 and −2.480, respectively. The shifting pattern also shows that double-shifts and/or range shifts are avoided when shifting sequentially because two adjoining gear steps jointly use one control element. It is preferable if the fourth gear is configured as a direct gear.

The first gear is defined by engaging the brake 03 and the clutch 36, the second gear by engaging the brake 04 and the clutch 36, and the third gear is defined by engaging the clutches 14 and 36. Furthermore, the fourth gear is defined by engaging the clutch 13 and the clutch 36, the fifth gear by engaging the clutches 13 and 14, and the sixth gear by engaging the brake 04 and the clutch 13. As the shifting pattern shows, the reverse gear is defined by engaging the brake 03 and the clutch 14.

According to the invention, initiating driver with an integrated control element 03, 36 is possible (IAK), for which particularly the brake 03 is suited, which is required in the first gear and the reverse gear. Furthermore, depending on the shifting logic, different gear steps may be obtained from the same gear pattern, allowing application- and/or vehicle-specific variations.

Figure 3:
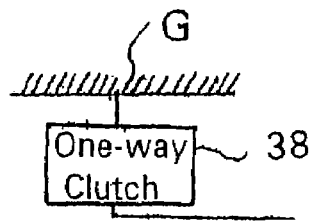
FIG. 3 is a diagrammatic view of an embodiment of the inventive multi-speed transmission having a one-way clutch.

In addition, as shown in FIG. 3, it is possible to provide additional one-way clutches 38 in suitable locations of the multi-speed transmission, for example between a shaft and the housing, or to optionally connect two shafts.

Figure 8:
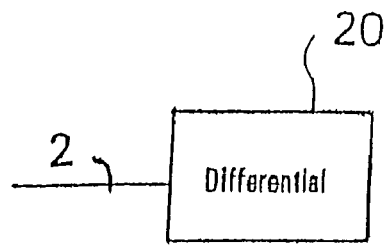
FIG. 8 is a diagrammatic view of an embodiment of the inventive multi-speed transmission having a differential.

On the input side or on the output side, an axle differential 20 and/or a transfer case may be provided according to the invention, shown in FIG. 8.

Figure 7:
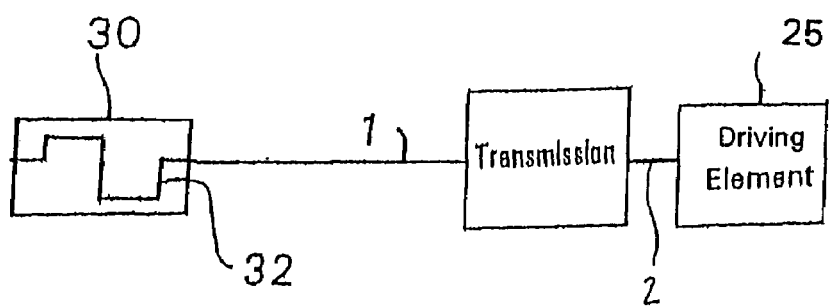
FIG. 7 is a diagrammatic view of another embodiment of the inventive multi-speed transmission with the crankshaft of the drive motor fixed to the input shaft of the multi-speed transmission and the driving element located behind the multi-speed transmission.
Figure 9:
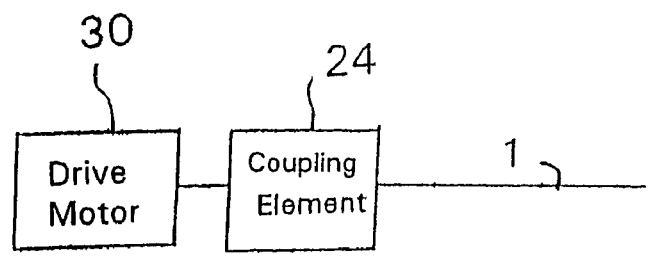
FIG. 9 is a diagrammatic view of an embodiment of the inventive multi-speed transmission with a clutch element and a drive motor.
Figure 10:
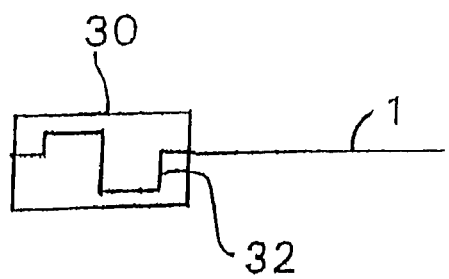
FIG. 10 is a diagrammatic view of an embodiment of the inventive multi-speed transmission with a crankshaft of the drive motor fixed to an input shaft of the multi-speed transmission.

Within the scope of an advantageous further development, as shown in FIG. 9, the input shaft 1 may be separated from a driving motor 30 as needed by a coupling element 24, wherein the coupling element 24 may be a hydrodynamic converter, a hydraulic clutch, a dry starting clutch, a wet starting clutch, a magnetic powder clutch or a centrifugal clutch. It is also possible, as shown in FIG. 7, to provide such a driving element 25 in the power flow direction behind the transmission, wherein in this case, as seen in FIG. 10, the input shaft 1 is permanently connected to the crankshaft 32 of the drive motor 30.

Figure 11:
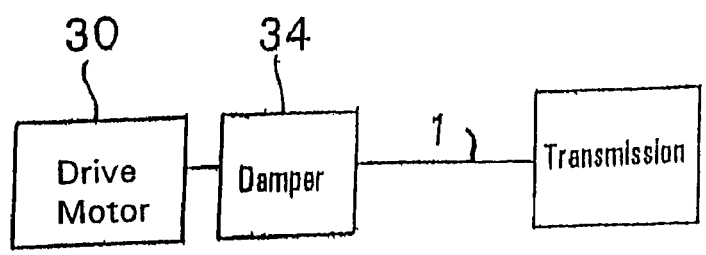
FIG. 11 is a diagrammatic view of an embodiment of the inventive multi-speed transmission having the drive motor communicating with a damper.

The multi-speed transmission according to the invention, shown in FIG. 11, also allows the provision of a torsional vibration damper 34 between the drive motor 30 and the transmission.

Figure 5:
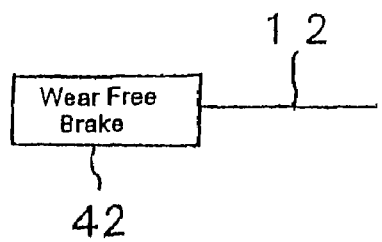
FIG. 5 is a diagrammatic view of a preferred design of the inventive multi-speed transmission having a wear-free brake.
Figure 12:
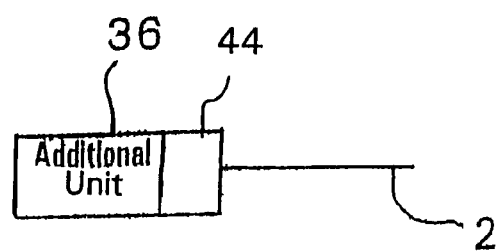
FIG. 12 is a diagrammatic view of an embodiment of the inventive multi-speed transmission with a power take-off for driving an additional unit.

Within the scope of a further embodiment of the invention, shown in FIG. 5, a wear-free brake 42, such as a hydraulic or electric retarder or the like, may be provided on each shaft, preferably on the input shaft 1 or the output shaft 2, which is particularly important when the transmission is used in commercial vehicles. Furthermore, as shown in FIG. 12, a power take-off 44 may be provided on each shaft, preferably on the input shaft 1 or the output shaft 2, to drive additional units 36.

Figure 6:
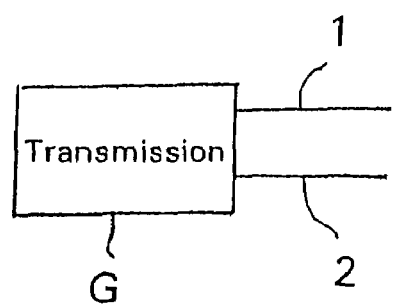
FIG. 6 is a diagrammatic view of a further embodiment of the invention with the input and the output being provided on the same side of the housing.

Additionally, as shown in FIG. 6, the input and output shafts are provided on the same side of the housing. The control elements that are used may be configured as power-shift clutches or brakes. In particular, power-shift clutches or brakes such as multi-disk clutches, band brakes and/or cone clutches, may be used. Furthermore, it is also possible to use positive brakes and/or clutches, such as synchronization devices or claw clutches, as the control elements.

Figure 4:
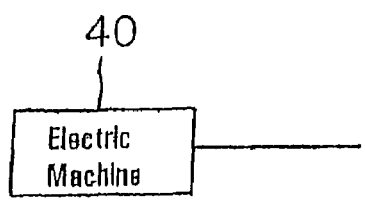
FIG. 4 is a diagrammatic view of an embodiment of the inventive multi-speed transmission with an electric machine.

A further advantage of the multi-speed transmission presented and shown in FIG. 4 here is that an electric machine 40 can be provided on each shaft as a generator and/or as an additional drive unit 36.

Of course, any design configuration, particularly any spatial configuration of the planetary gear sets and the control elements as such as well as in relation to each other, to the extent they are technically expedient, falls under the scope of protection of the present claims, without influencing the function of the transmission as described in the claims, even if these embodiments are not explicitly illustrated in the figures or mentioned in the description.

REFERENCE SYMBOLS

0 Shaft
1 Shaft
2 Shaft
3 Shaft
4 Shaft
5 Shaft
6 Shaft
03 Brake
04 Brake
13 Clutch
14 Clutch
36 Clutch
P1 Planetary gear set
P2 Planetary gear set
P3 Planetary gear set
An Input
Ab Output
i Gear ratio
phi Progressive ratio
G Housing

The invention claimed is:

1. A multi-speed transmission of a planetary design for an automatic transmission of a motor vehicle, the transmission comprising:
   an input shaft (1) and an output shaft (2) arranged in a housing (G);
   first, second, and third planetary gear sets (P1, P2, P3), and each of the first, the second, and the third planetary gear sets (P1, P2, P3) comprising, a sun gear, a carrier, and a ring gear;
   at least third, fourth, fifth and sixth rotatable shafts (3, 4, 5, 6), as well as at least five control elements (03, 04, 13, 14, 36) comprising first and second brakes (03, 04) and first, second and third clutches (13, 14, 36) whose selective engagement creates different gear ratios between the input shaft (1) and the output shaft (2) so that at least first, second, third, fourth, fifth and sixth forward gears and one reverse gear are implemented;
   wherein the input shaft (1) is permanently connected to the sun gear of the second planetary gear set (P2) and is couplable, via the first clutch (13), to the third shaft (3) and the input shaft (1) is couplable, via the second clutch (14), to the fourth shaft (4);
   the third shaft (3) is permanently connected to the carrier of the first planetary gear set (P1) and the third shaft (3) is couplable, via the first brake (03), to the housing (G) and is couplable, via the third clutch (36), to the sixth shaft (6);
   the fourth shaft (4) is permanently connected to the sun gear of the first planetary gear set (P1) and is couplable, via the second brake (04), to the housing (G);
   the fifth shaft (5) is permanently connected to the internal gear of the first planetary gear set (P1) and the carrier of the third planetary gear set (P3);
   the sixth shaft (6) is permanently connected to the internal gear of the second planetary gear set (P2);
   the output shaft (2) is permanently connected to the internal gear of the third planetary gear set (P3) and the carrier of the second planetary gear set (P2); and
   the sun gear of the third planetary gear set (P3) fixed, via a seventh shaft (0), to the housing (G).

2. The multi-speed transmission according to claim 1, wherein the first, the second and the third planetary gear sets (P1, P2, P3) are arranged, in a direction of power flow, in the sequential order of:
   the first planetary gear set (P1), the second planetary gear set (P2) and the third planetary gear set (P3).

3. The multi-speed transmission according to claim 1, wherein the first, the second and the third planetary gear sets (P1, P2, P3) are negative planetary gear sets.

4. The multi-speed transmission according to claim 1, wherein the first and the second clutches (13, 14) are arranged, in the direction of power flow, in front of the first planetary gear set (P1) and in the sequential order of:
   the first clutch (13) and the second clutch (14).

5. The multi-speed transmission according to claim 1, wherein the first and the second clutches (13, 14) are multi-disk clutches which have a common outer disk.

6. The multi-speed transmission according to claim 1, wherein the first and the second brakes (03, 04) are arranged, in the direction of power flow, in front of the first planetary gear set (P1) and in the sequential order of:
   the second brake (04) and the first brake (03).

7. The multi-speed transmission according to claim 1, wherein the first gear results from engagement of the first brake (03) and the third clutch (36), the second gear results from engagement of the second brake (04) and the third clutch (36), the third gear results from engagement of the second and the third clutches (14, 36), the fourth gear results from engagement of the first and the third clutches (13, 36), the fifth gear results from engagement of the first and second clutches (13, 14), and the sixth gear results from engagement of the second brake (04) and the first clutch (13).

8. The multi-speed transmission according to claim 1, wherein the reverse gear results from engagement of the first brake (03) and the second clutch (14).

9. The multi-speed transmission according to claim 1, wherein at least one one-way clutch is provided in the transmission.

10. The multi-speed transmission according to claim 9, wherein the one-way clutch is provided between at least one of the input shaft (1), the output shaft (2), the third shaft (3), the fourth shaft (4), the fifth shaft (5) and the sixth shaft (6) and the housing (G).

11. The multi-speed transmission according to claim 1, wherein the input and the output shafts (1, 2) are located on a common side of the housing (G).

12. The multi-speed transmission according to claim 1, wherein one of an axle differential and a transfer case is provided on one of an input side and output side of the transmission.

13. The multi-speed transmission according to claim 1, wherein a coupling element facilitates separation of the input shaft (1) from a drive motor.

14. The multi-speed transmission according to claim 13, wherein the coupling element is one of a hydrodynamic converter, a hydraulic clutch, a dry starting clutch, a wet starting clutch, a magnetic powder clutch, and a centrifugal clutch.

15. The multi-speed transmission according to claim 1, wherein an external driving element is arrange, in the direct of power flow, downstream of the transmission and the input shaft (1) is firmly connected to a crankshaft of a drive motor.

16. The multi-speed transmission according to claim 1, wherein staring of the transmission occurs by engagement of one of the first brake (03) and the third clutch (36), and the input shaft (1) is permanently connected to a crankshaft of a drive motor.

17. The multi-speed transmission according to claim 1, wherein a torsional vibration damper is arranged between a drive motor and the transmission.

18. The multi-speed transmission according to claim 1, wherein a wear-free brake is arranged on at least one of the input shaft (1), the output shaft (2), the third shaft (3), the fourth shaft (4), the fifth shaft (5) and the sixth shaft (6).

19. The multi-speed transmission according to claim 1, wherein a power take-off is arranged on at least one of the input shaft (1), the output shaft (2), the third shaft (3), the fourth shaft (4), the fifth shaft (5) and the sixth shaft (6) for driving an additional unit.

20. The multi-speed transmission according to claim 19, wherein the power take-off is arranged on one of the input shaft (1) and the output shaft (2).

21. The multi-speed transmission according to claim 1, wherein the five control elements (03, 04, 13, 14, 36) are one of power-disk clutches and power-shift brakes.

22. The multi-speed transmission according to claim 21, wherein the five control elements (03, 04, 13, 14, 36) are one of a multi-disk clutches, band brakes, and cone clutches.

23. The multi-speed transmission according to claim 1, wherein the five control elements (03, 04, 13, 14, 36) are one of positive brakes and positive clutches.

24. The multi-speed transmission according to claim 1, wherein an electric machine is arranged on at least one of the input shaft (1), the output shaft (2), the third shaft (3), the fourth shaft (4), the fifth shaft (5) and the sixth shaft (6) as one of a generator and an additional driving unit.

\* \* \* \* \*